(12) United States Patent
Goyal

(10) Patent No.: US 11,853,317 B1
(45) Date of Patent: Dec. 26, 2023

(54) CREATING REPLICAS USING QUERIES TO A TIME SERIES DATABASE

(71) Applicant: Amazon Technologies, Inc., Seattle, WA (US)

(72) Inventor: Dumanshu Goyal, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 823 days.

(21) Appl. No.: 16/357,224

(22) Filed: Mar. 18, 2019

(51) Int. Cl.
*G06F 16/27* (2019.01)
*G06F 16/2458* (2019.01)

(52) U.S. Cl.
CPC .......... *G06F 16/27* (2019.01); *G06F 16/2477* (2019.01)

(58) Field of Classification Search
CPC .............................. G06F 16/27; G06F 16/2477
See application file for complete search history.

(56) References Cited

U.S. PATENT DOCUMENTS

| | | | |
|---|---|---|---|
| 7,519,734 B1 * | 4/2009 | Dumitriu | H04L 47/70 718/105 |
| 7,779,025 B2 | 8/2010 | Gunawardena et al. | |
| 8,132,046 B2 | 3/2012 | Varghese | |
| 8,219,581 B2 | 7/2012 | Roy et al. | |
| 8,276,154 B2 | 9/2012 | Toub et al. | |
| 8,335,765 B2 | 12/2012 | Sivasubramanian et al. | |
| 8,386,540 B1 | 2/2013 | McAlister et al. | |
| 8,595,547 B1 | 11/2013 | Sivasubramanian et al. | |
| 8,601,112 B1 | 12/2013 | Nordstrom et al. | |
| 9,128,965 B1 * | 9/2015 | Yanacek | G06F 16/213 |
| 9,286,001 B2 | 3/2016 | Skjolsvold et al. | |
| 9,449,122 B2 | 9/2016 | Haas et al. | |
| 9,514,199 B1 * | 12/2016 | Deprey | G06F 16/957 |
| 9,607,019 B1 | 3/2017 | Swift et al. | |
| 9,607,067 B2 | 3/2017 | Haas et al. | |
| 9,626,374 B2 | 4/2017 | Hirsch et al. | |
| 9,672,257 B2 | 6/2017 | Tobin et al. | |
| 9,817,727 B2 | 11/2017 | McAlister et al. | |
| 9,836,492 B1 | 12/2017 | Hermanson | |
| 9,934,107 B1 | 4/2018 | Chikkanayakanahally et al. | |
| 10,007,513 B2 | 6/2018 | Malladi et al. | |
| 10,459,827 B1 | 10/2019 | Aghdaie et al. | |

(Continued)

FOREIGN PATENT DOCUMENTS

WO 2015070232 A1 5/2015

OTHER PUBLICATIONS

U.S. Appl. No. 16/199,078, filed Nov. 23, 2018, Timothy A. Rath.

(Continued)

*Primary Examiner* — Mariela Reyes
*Assistant Examiner* — Fatima P Mina
(74) *Attorney, Agent, or Firm* — Alexander A. Knapp; Kowert, Hood, Munyon, Rankin & Goetzel, P.C.

(57) ABSTRACT

Creating replicas using queries may be implemented for a time series database. A new host for a new copy of time series database data may be added and idempotent ingestion of additional data to be included in the new copy after a creation time for the new copy may be performed. Queries to other hosts that store the time series database data may be performed to obtain time series data prior to the creation time. Idempotent ingestion of the results of the queries may be performed at the new host after which performance of queries to the new copy of the time series database may be allowed at the new host.

18 Claims, 9 Drawing Sheets

(56) References Cited

U.S. PATENT DOCUMENTS

| | | |
|---|---|---|
| 10,776,355 B1 | 9/2020 | Batsakis et al. |
| 2004/0133590 A1* | 7/2004 | Henderson .......... G06F 16/2246 |
| 2014/0122434 A1* | 5/2014 | Knight ................ G06F 11/1453 |
| | | 707/645 |
| 2015/0135255 A1* | 5/2015 | Theimer ............. H04L 67/1004 |
| | | 726/1 |
| 2015/0293955 A1 | 10/2015 | Dickey |
| 2016/0328432 A1* | 11/2016 | Raghunathan ...... G06F 16/2264 |
| 2016/0357828 A1 | 12/2016 | Tobin et al. |
| 2017/0060574 A1 | 3/2017 | Malladi et al. |
| 2017/0103103 A1 | 4/2017 | Nixon et al. |
| 2017/0177546 A1 | 6/2017 | Heinz et al. |
| 2017/0177646 A1 | 6/2017 | Chen et al. |
| 2017/0286486 A1 | 10/2017 | Pang |
| 2017/0286499 A1 | 10/2017 | Bingham et al. |
| 2018/0232422 A1 | 8/2018 | Park et al. |
| 2018/0246934 A1 | 8/2018 | Arye et al. |
| 2019/0050453 A1 | 2/2019 | Duffield et al. |
| 2019/0146849 A1 | 5/2019 | Leonard et al. |
| 2019/0171748 A1 | 6/2019 | Duffield |
| 2019/0250819 A1* | 8/2019 | Jain ......................... G06F 3/061 |

OTHER PUBLICATIONS

U.S. Appl. No. 16/199,102, filed Nov. 23, 2018, Timothy A. Rath.
U.S. Appl. No. 16/199,103, filed Nov. 23, 2018, Timothy A. Rath.
Anonymous, "Amazon Kinesis Streams: Developer Guide", Dated Nov. 16, 2017, From http://web.archive.org/web/20171116223501if_/ http://docs.aws.amazon.com:80/streams/latest/dev/kinesis-dg.pdf, pp. 1-143.
Anonymous, Amazon Kinesis Firehose: Developer Guide, dated Oct. 25, 2017, From http://web.archive.org/web/20171025072815if_/ http://docs.aws.amazon.com:80/firehose/latest/dev/firehose-dg.pdf, p. 1-66.
U.S. Appl. No. 17/349,786 dated Jun. 16, 2021, Sudipto Das.
U.S. Appl. No. 17/234,372 dated Apr. 19, 2021, Evgeniy Retyunskiy.
U.S. Appl. No. 16/357,224 dated Mar. 18, 2019, Dumanshu Goyal.
U.S. Appl. No. 17/349,790 dated Jun. 16, 2021, Sudipto Das.

* cited by examiner

CREATING REPLICAS USING QUERIES TO A TIME SERIES DATABASE

BACKGROUND

Database systems managing large amounts of data on behalf of users may distribute and/or replicate that data across two or more machines, often in different locations, for any of a number of reasons, including security issues, disaster prevention and recovery issues, data locality and availability issues, etc. As the scale of data stored increases, database systems may implement different techniques for distributing and replicating data that can cope with the increasing demand upon data storage resources to provide highly performant access to data while still preserving the various management features that contribute to data availability and durability. For example, multiple copies of data may be stored at different locations in order to distribute the risk of failure amongst the differently locations.

Failures of host systems that store copies of database data may result in attempts to create new copies in order to mitigate the effect of the failure. Other scenarios for creating new copies, such as increases in demand upon a database, may also occur. Therefore, techniques to add copies of database data without straining the resources currently hosting the database may be highly desirable.

Figure 1:
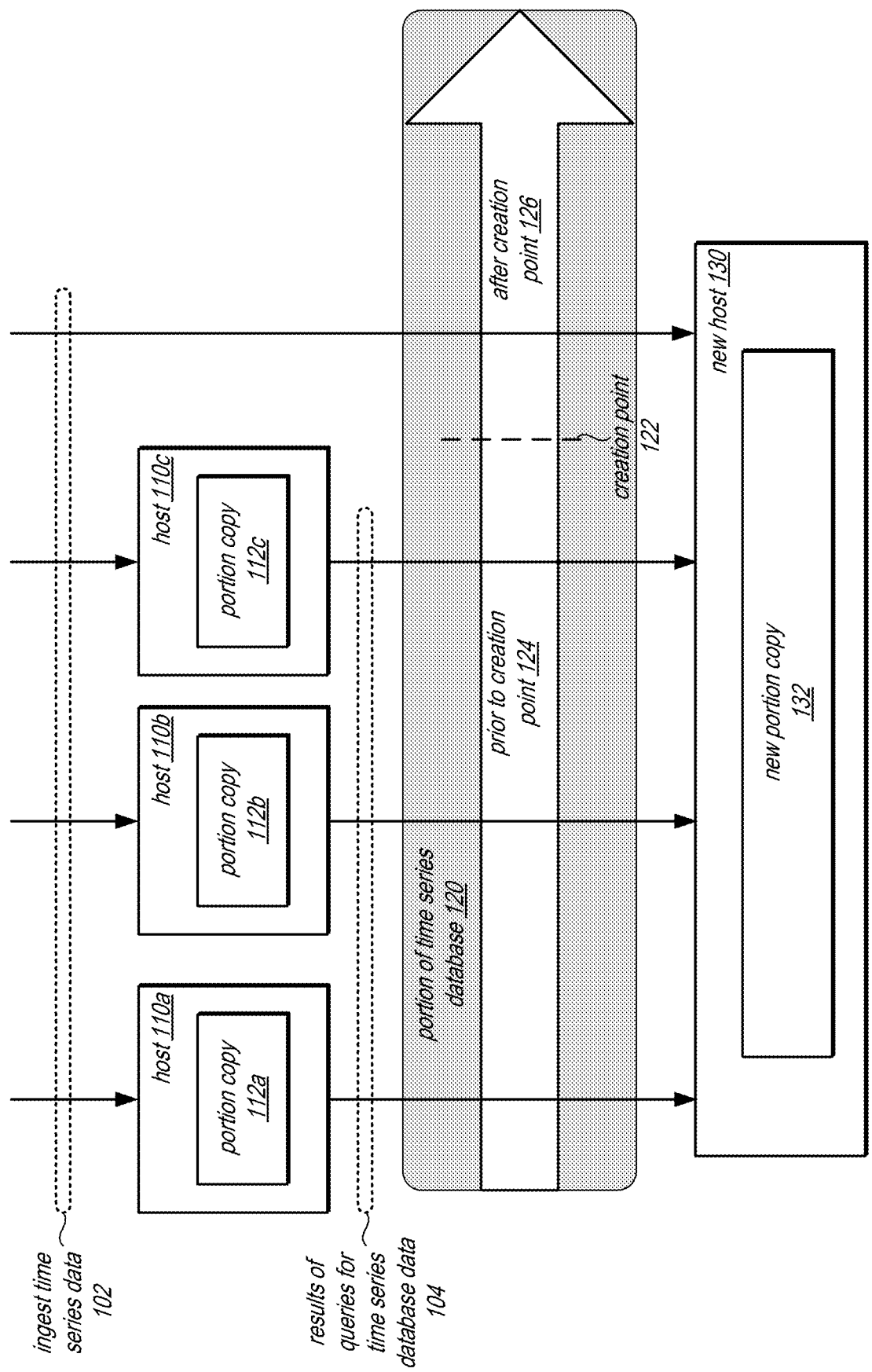
FIG. 1 is a logical block diagram illustrating creating replicas using queries to a time series database, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Creating replicas for performing queries to a time series database may be implemented in various embodiments, as described herein. Time series databases, in various embodiments, may store time series data (e.g., data value(s) indexed according to time), which may be subsequently be queried to perform various types of requests or analyses upon the time series data. Time series databases may distribute copies of data in a time series database, in various embodiments, in order to increase the availability, reliability and performance of the time series database to perform queries. For example, as discussed in detail below with regard to FIGS. 2 and 3, different storage tiers could offer different types of storage and query performance. Storing multiple copies, for example, may allow for requests accessing different items of data in a same time series database to parallelize the work among different systems which can utilize respective copies to perform the work for the access requests, in some embodiments.

In order to provide the benefits of storing multiple copies, new copies of data of a time series database may be created in different scenarios. For example, if a storage host, node, or other computing system storing one copy of time series data fails (or otherwise becomes unavailable), then a new copy of the time series database may be created to replace the unavailable copy of time series data. Techniques for creating a new copy, however, may have to account for different performance or architectural concerns. For instance, the entities moving data to create a copy may have to satisfy security concerns in order to prevent leaks of data (e.g., when user data in a storage layer of a time series database is moved into systems, hosts, or devices that implement a control plane layer). Another concern may be to minimize the impact of creating a new copy of data (e.g., minimizing workload imposed on other hosts that store a copy of data which may also be servicing client requests to access the data). In various embodiments, creating replicas using queries to a time series database may avoid, address, or otherwise minimize negative performance impacts that creating a new copy of data for a time series database would otherwise incur, thus improving the capabilities of a time series database to create copies of data to maintain or increase the benefits of data distribution, as discussed above.

FIG. 1 is a logical block diagram illustrating creating replicas using queries to a time series database, according to some embodiments. Time series data may be added to a time series database through an ingestion process, in some embodiments. For example, a time series database may be an append-only database where time series data is immutable when individual records, data points, or other data objects are received and ingested into the time series database in idempotent fashion so that ingesting the same records, data points, or other data objects may result in the same content stored in the database (e.g., multiple requests to ingest the same record may result in one copy of the record being stored in the time series database). In at least some embodiments, not all of a time series database may be stored in one object or copy of the time series database.

As illustrated in FIG. 1, a portion of time series database 120 (e.g., a range or other portion of the time series data, such as partition or tile discussed below) may be stored as different respective copies, such as portion copy 112*a*, 112*b*, and 112*c*, at hosts 110*a*, 110*b*, and 110*c*. Ingestion of time series data 102 may be performed so that as additional time series data is received, the portion copies 112 at hosts 110 may be updated with additional data. For example, an ingestion pipeline, ingestion fleet, or other frontend for the time series database may receive time series data and distribute it to the appropriate hosts 110.

A control plane, or other component for a time series database, may detect an event to add a new host and new copy of the portion of the time series database, such as new host 130 and new portion copy 132. As discussed in detail below, the new host 130 may be provisioned from available systems, nodes, or devices (e.g., computing system 1000 in FIG. 9 below). A creation point 122 for the time series data portion may represent a point in time which prior time series data 124 may be obtained from portion copies 112 and time series data for the portion after the creation point 126 may be obtained through the ingestion of time series data 102. For example, when the ingestion process is initiated for new host 130, the received time series data through ingestion 102 may be received at new host 130 at the same (or near same) time as received at current hosts 110, and thus ingesting the time series data directly from the ingestion process may reduce the burden placed upon hosts 110 to provide data for the new portion copy 132.

As indicated at 104, queries to hosts 110 may result in the time series data of the portion prior to the creation point 124 being sent as results to new host 130 to include in new portion copy 132. For example, as discussed below with regard to FIGS. 4 and 5, hosts from a same or different storage tier may be hosts 110 which may respond to queries. The source of the queries may be different, in different embodiments, as also discussed below with regard to FIGS. 4 and 5. By performing queries to hosts 110 instead of relying upon a background copy mechanism, file transfer protocol, or other physical or non-logical replication technique for retrieving time series data, existing load balancing, query performance optimization, and other performance enhancements that allow hosts to efficiently perform the work to retrieve and send the data specified in the queries can be used to update the new portion copy 132, reducing the workload management complexity of hosts 110 (e.g., switching between a background copy operation to update new portion copy 132 and foreground operations to serve other client queries which may also be received while the new portion copy is being created).

Please note that previous descriptions creating replicas using queries to a time series database are not intended to be limiting, but are merely provided as logical examples. For example, the number, size, type, and arrangement of hosts, copies, ingestion processes, or other illustrated features may be different than those discussed above with regard to FIG. 1

This specification begins with a general description of a provider network that may implement a time series database service that may implement creating replicas using queries to a time series database. Then various examples of a time series database service are discussed, including different components/modules, or arrangements of components/module, that may be employed as part of implementing the time series database service, in one embodiment. A number of different methods and techniques to implement creating replicas using queries to a time series database are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
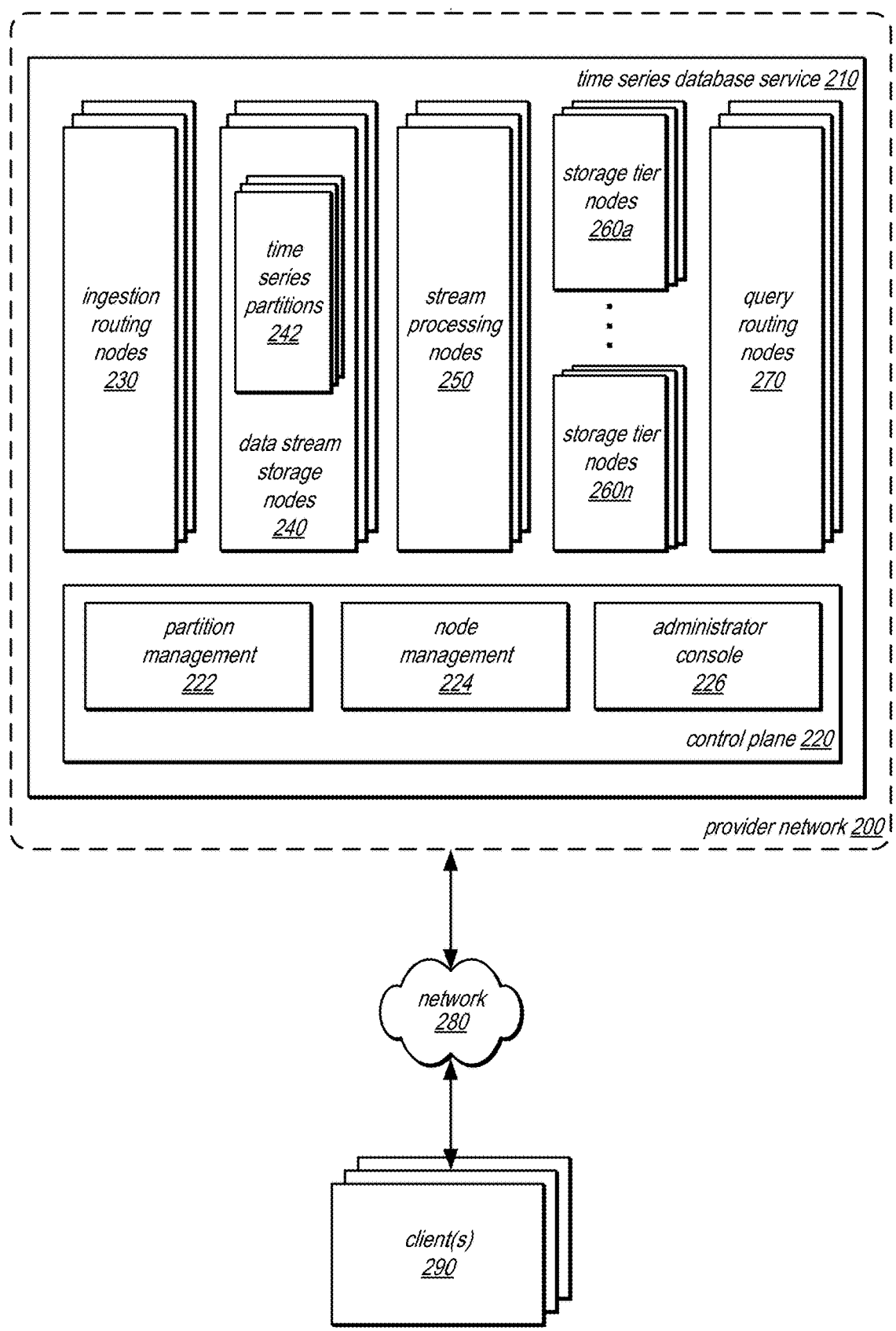
FIG. 2 is a logical block diagram illustrating a provider network offering a time series database service that may implement creating replicas using queries to a time series database, according to some embodiments.

FIG. 2 is a logical block diagram illustrating a provider network offering a time series database service that may implement creating replicas using queries to a time series database, according to some embodiments. Provider network 200 may be a private or closed system, in one embodiment, or may be set up by an entity such as a company or a public sector organization to provide one or more services (such as various types of cloud-based storage) accessible via the Internet and/or other networks to clients 290, in another embodiment. In one embodiment, provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200. In one embodiment, provider network 200 may implement various computing resources or services, such as time series database service 210 (e.g., a database service that indexes or otherwise provides access to data modeled as time series of items (e.g., records)), and other services (not illustrated), such as a data warehouse service, data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes) or hosts, in one embodiment, each of which may be similar to the computer system embodiment illustrated in FIG. 9 and described below. In one embodiment, the functionality of a given system or service component (e.g., a component of time series database service 210) may be implemented by a particular node or may be distributed across several nodes. In some embodiments, a given node may implement the functionality of more than one service system component (e.g., more than one data store component).

Time series database service 210 may be implemented in one embodiment, to store items (e.g., records, objects, logs, etc.) as a time series in a time series database. Such a service may be an enterprise-class database system that is highly scalable and extensible. In one embodiment, access requests (e.g., requests to get/obtain items, put/insert items, delete items, update or modify items, scan multiple items) may be directed to a time series in time series database service 210 that is distributed across multiple physical resources according to a partition scheme, and the database system may be scaled up or down on an as needed basis. In one embodiment, clients/subscribers may submit requests in a number of ways, e.g., interactively via graphical user interface (e.g., a console) or a programmatic interface to the database system. In one embodiment, time series database service 210 may provide a RESTful programmatic interface in order to submit access requests (e.g., to get, insert, delete, or scan data).

In one embodiment, clients 290 may encompass any type of client configurable to submit network-based requests to provider network 200 via network 280, including requests for time series database service 210 (e.g., to access item(s) in a series in time series database service 210 or to store data values in a time series database, such as measures, metrics, or other information collected by different devices implemented as part of an Internet of Things (JOT) architecture). In one embodiment a given client 290 may include a suitable version of a web browser, or may include a plug-in module or other type of code module that executes as an extension to or within an execution environment provided by a web browser. Alternatively in a different embodiment, a client 290 may encompass an application such as a database client/application (or user interface thereof), a media application, an office application or any other application that may make use of a time series in time series database service 210 to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 290 may be an application that interacts directly with provider network 200, in one embodiment. In one embodiment, client 290 may generate network-based services requests according to a Representational State Transfer (REST)-style network-based services architecture, a document- or message-based network-based services architecture, or another suitable network-based services architecture.

In some embodiments, clients of time series database service 210 may be implemented on resources within provider network 200 (not illustrated). For example, a client application may be hosted on a virtual machine or other computing resources implemented as part of another provider network service that may send access requests to time series database service 210 via an internal network (not illustrated) similar to the requests and interactions discussed with regard to client(s) 290.

In one embodiment, a client 290 may provide access to provider network 200 to other applications in a manner that is transparent to those applications. For example, client 290 may integrate with a database on time series database service 210. In such an embodiment, applications may not need to be modified to make use of a service model that utilizes time series database service 210. Instead, the details of interfacing to the time series database service 210 may be coordinated by client 290.

Client(s) 290 may convey network-based services requests to and receive responses from provider network 200 via network 280, in one embodiment. In one embodiment, network 280 may encompass any suitable combination of networking hardware and protocols necessary to establish network-based-based communications between clients 290 and provider network 200. For example, network 280 may encompass the various telecommunications networks and service providers that collectively implement the Internet. In one embodiment, network 280 may also include private networks such as local area networks (LANs) or wide area networks (WANs) as well as public or private wireless networks. For example, both a given client 290 and provider network 200 may be respectively provisioned within enterprises having their own internal networks. In such an embodiment, network 280 may include the hardware (e.g., modems, routers, switches, load balancers, proxy servers, etc.) and software (e.g., protocol stacks, accounting software, firewall/security software, etc.) necessary to establish a networking link between given client(s) 290 and the Internet as well as between the Internet and provider network 200. It is noted that in one embodiment, client(s) 290 may communicate with provider network 200 using a private network rather than the public Internet.

Time series database service 210 may implement ingestion routing nodes 230, in some embodiments. Ingestion routing nodes 230 may perform requests to store items in a time series of a time series database hosted in time series database service 210. For example, a client 290 may send a request to store an item in a time series to a network address or other endpoint which may be received at a load balancer which may implement one or more load balancing schemes to direct the request to one of ingestion routing nodes 230, in some embodiments. For example, ingestion nodes may apply various kinds of hash or other distribution schemes to identify which partition an item belongs to. Because ingestion routing nodes 230 may not be limited or assigned to particular time series databases, in some embodiments, ingestion routing nodes 230 may maintain partition schemes for storing items according to a partitioning scheme for the time series to which the item is to be added for any time series at any of the one or multiple time series databases that may be hosted by time series database service 210.

In some embodiments, time series database service 210 may also implement a data stream store, such as may be implemented by data stream storage nodes 240, each of which may manage one or more partitions 242 of a time series of a time series database on behalf of clients/users or on behalf of time series database service 210 which may be stored in storage (on storage devices attached to storage nodes 240 or in network storage accessible to storage nodes 240). Data stream storage nodes 240 may be implemented as part of a data stream service of provider network 200 (not illustrated) and utilized as the underlying storage for time series database service 210, in some embodiments. For example, each partition of a time series database may be a separate data stream that is hosted in the separate database service.

In some embodiments, time series database service 210 may implement stream processing nodes 250 to retrieve data from time series partitions, and send it to different storage tier nodes, such as storage tier nodes 260*a* to 260*b*. In this way, the different storage tier nodes 260 can ingest the time series data of a partition received from stream processing nodes 250. Control plane 220 may provide stream processing nodes with a mapping of partitions to storage nodes 260 (e.g., 2 copies of a partition in a first storage tier at two different nodes in storage tier nodes 260*a* and 4 copies of the partition in a second storage tier at four different nodes in storage tier nodes 260*n*).

Different storage tiers may offer different types of query processing (or other analysis request) performance, in some embodiments. For example, a hot storage tier may ingest time series data into an in-memory data structure for providing fast query responses. Another storage tier, such as a cold storage tier, may ingest time series data into persistent storage as files or data objects (e.g., instead of individual records as may be implemented in the hot storage tier), which may offer a richer set of query or other analysis request features than hot tier storage and larger period of time in which the time series database data is available (e.g., older data is available than would be accessible in hot tier storage) but may incur higher processing cost and time to respond to queries and other analysis requests).

In some embodiments, time series database service 210 may implement query routing nodes 270 to parse and dispatch queries to one or multiple time series in a time series database to the appropriate storage tier nodes 260 in different storage tiers, such as hot tier storage nodes or cold tier storage nodes, as discussed below with regard to FIG. 3.

In one embodiment, time series database service 210 may implement control plane 220 to implement one or more administrative components. In various embodiments, control plane 220 may direct the performance of different types of control plane operations among the nodes, systems, or devices implementing time series database service 210, in one embodiment. Control plane 220 may provide visibility and control to system administrators via administrator console 226, in some embodiments. Admin console 226 may allow system administrators to interact directly with time series database service 210 (and/or the underlying system). In one embodiment, the admin console 226 may be the primary point of visibility and control for time series database service 210 (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup or other management operations for a time series, at time series database service 210, in one embodiment.

Node management 224 may provide resource allocation, in one embodiment, for storing additional data in time series submitted to database time series service 210. For instance, node management 224 may communicate with storage nodes 260 to initiate the performance of various control plane operations (such as requests to update create time series, configure time series, etc.). In one embodiment, node management 224 may include a node recovery feature or component that handles failure events for ingestion nodes 230, data stream storage nodes 240, storage tier nodes 260, and/or query routing nodes 270 (e.g., adding new nodes, removing failing or underperforming nodes, deactivating or decommissioning underutilized nodes, etc.) which may include the creation of new copies at storage tier nodes, as discussed in detail below with regard to FIGS. 4-8.

Various durability, resiliency, control, or other operations may be directed by control plane 220. For example, partition management 222 may detect split, copy, or move events for time series partitions at storage nodes 240 in order to ensure that the storage nodes 240 maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. Node management 224 may then direct performance of the creation of the new copy, as discussed below with regard to FIGS. 4-8. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance.

In some embodiments, the partition moving process described above may be employed in partition splitting operations by partition management 222 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation). In some embodiments, a client application could request a partition operation (e.g., a split, move, merge, etc.) via control plane 220.

In some embodiments, each time series partition 242 may be identified by a partition ID, which may be a unique number (e.g., a GUID) assigned at the time the partition is created. When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by partition management 222, in various ways. For example, partition size and heat, where heat may be tracked by internally measured metrics (such as IOPS), externally measured metrics (such as latency), and/or other factors may be evaluated with respect to various performance thresholds, in some embodiments. System anomalies may also trigger split or move events (e.g., network partitions that disrupt communications between replicas of a partition in a replica group, in some embodiments. Partition management 222 (or node management 224) may detect storage node failures, or provide other anomaly control, in some embodiments.

Time series database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by time series database service 210 (and/or the underlying system) may be used to manipulate series-level entities, such as time series and indexes and/or to re-configure various time series. These APIs may be called relatively infrequently (when compared to data plane APIs). In some embodiments, the control plane APIs provided by the service may be used to create time series or at separate storage nodes, import time series, export time series, delete time series, perform various trend analysis or other time series evaluations, modify time series configurations or operating parameter for time series, and/or describe time series. The data plane APIs provided by time series database service 210 (and/or the underlying system)

may be used to perform item-level operations, such as requests for individual items or for multiple items in one or more time series, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Figure 3:
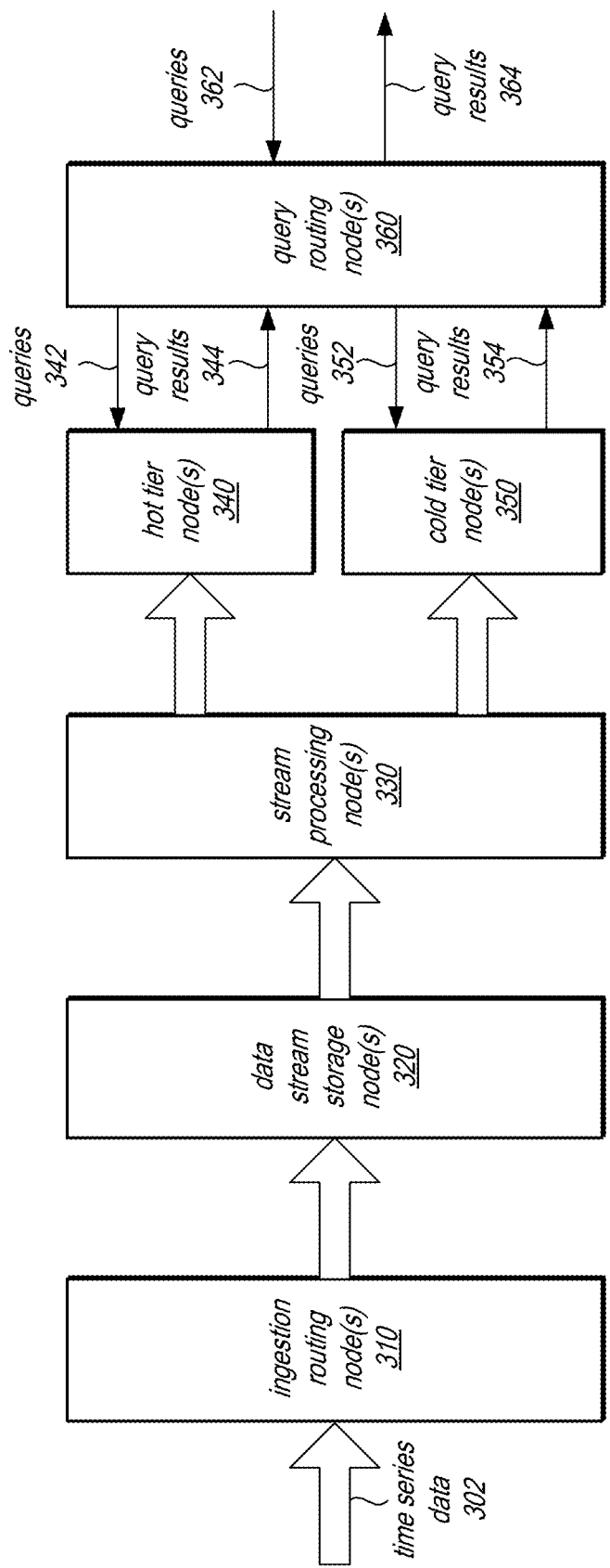
FIG. 3 is a logical block diagram illustrating interactions to access a time series database, according to some embodiments.

FIG. 3 is a logical block diagram illustrating interactions to access a time series database, according to some embodiments. An ingestion pipeline, technique or process may include receiving time series data 302 from a client of time series database service 210. For example, a submission API, or other request may accept time series data destined for an identified time series database, which ingestion routing node(s) 310 can then identify the appropriate data stream and data stream storage node(s) 320 that store the time series database identified for time series data 302. Stream processing node(s) 330 may then obtain time series data from data stream storage nodes 320 for ingestion into one or more storage tiers. For example, stream processing nodes may send the time series data to both hot tier node(s) 340 and cold tier nodes 350, in some embodiments, in order to make the time series data available for performing different queries 362.

As illustrated in FIG. 3, clients of time series database service (which may be different than the source of time series data 302 in some scenarios), may submit queries 362 via an interface to time series database service 210 (e.g., an API, an established connection, protocol, and/or query language, etc.). As noted above, query routing node(s) 360 can identify based on the type of query (and/or the workload of the underlying storage tier nodes) which storage tier nodes should perform the query. For instance, query routing nodes 360 may recognize queries to recent data (e.g., less than a time value threshold) and forward the request to hot tier storage nodes 340, which may maintain recent data in-memory in order to quickly perform queries, in some embodiments. Thus query routing nodes 360 may forward queries 342 to hot tier node(s) 340, which may provide query results 344 to query routing node(s) 360 which may then provide the results 364 to a requesting client. For queries to older data (or more complex operations, such as cross time series joins, time series analysis operations, etc.), query routing nodes 360 may forward the queries 352 on to cold tier storage nodes 350, which may be utilized to access time series data in slower storage (e.g., either from local storage or in a backup or archive store (not illustrated)). Cold tier node(s) 350 may perform the quer(ies) 352 and return results 354 to query routing node(s) 360, which may provide the query results 364 to a requesting client.

Figure 4:
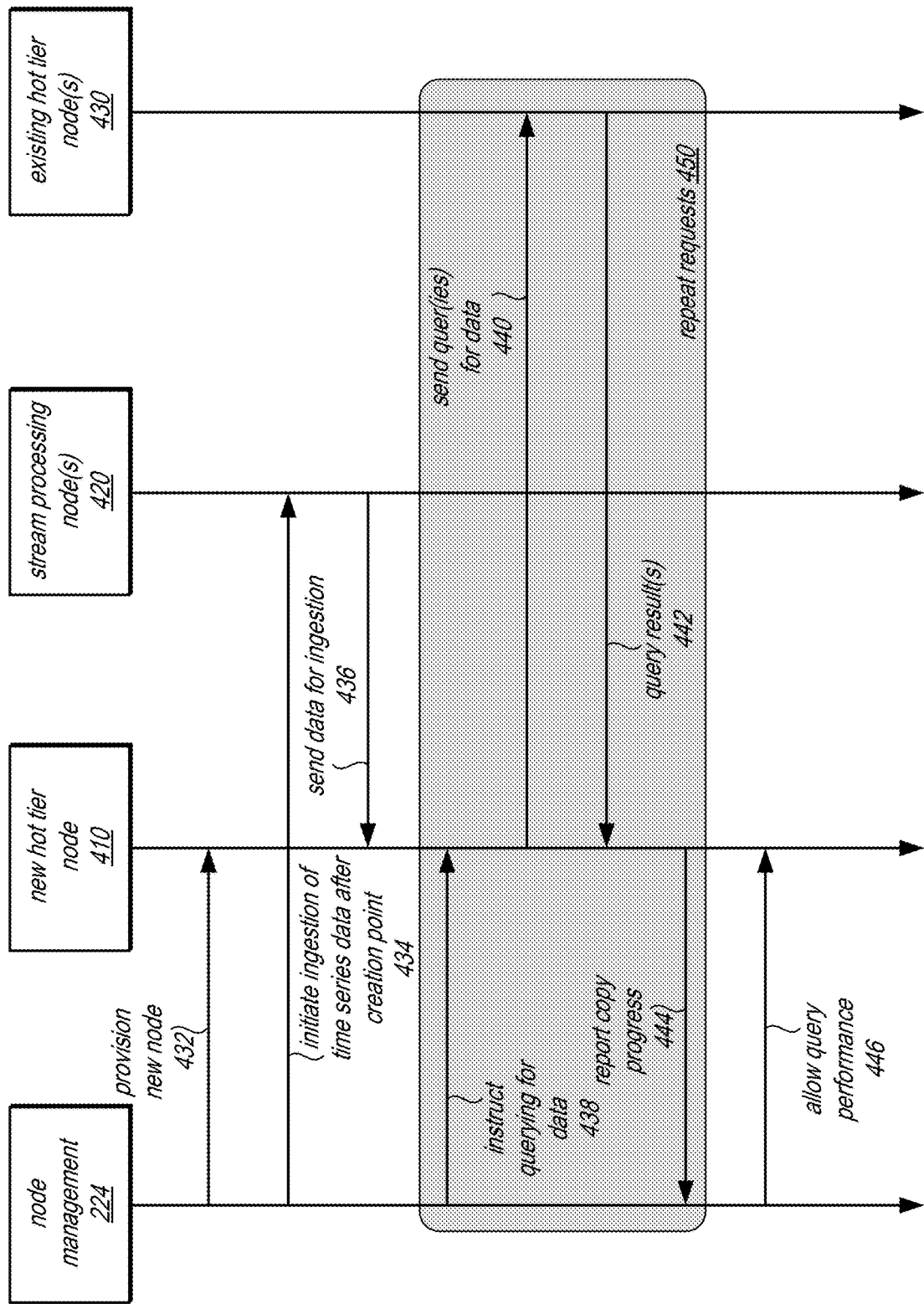
FIG. 4 is a sequence diagram illustrating hot tier replication for creating a copy of a portion of a time series database at a new host, according to some embodiments.

As noted above node management 224 of time series database service 210 may create or otherwise add a node to store a copy of a portion of time series database in various scenarios (e.g., node failures, changes in load or demand to increase query processing capacity, client requests, partition splits or moves). Different techniques for creating the replica using different resources in time series database service 210 may be performed by node management 224, in some embodiments. FIG. 4 is a sequence diagram illustrating hot tier replication for creating a copy of a portion of a time series database at a new host, according to some embodiments.

Node management 224 may detect an event to add a new hot tier node 410. For example, node management 224 may perform one or more requests to provision 432 new hot tier node 410 (e.g., by obtaining a lease or permission to utilize a host system from a pool of available nodes/hosts, directing the installation or configuration of hot tier node software or other information, reserving or allocating space on an existing hot tier node storing another partition for another time series database (e.g., for another user account) as hot tier nodes and cold tier nodes may be multi-tenant, in some embodiments).

Node management 224 may then initiate 434 ingestion of time series data after a creation point for the portion of the time series database at stream processing nodes 420, in some embodiments. For example, node management may send an updated mapping to stream processing node(s) 420, identifying new hot tier node 410 as ready to receive ingested data in a data stream from a data stream storage node, as discussed above. Stream processing node(s) 420 may begin sending data for ingestion 436 to new hot tier node 410, which may include the data in the new copy of the portion for the time series database in idempotent fashion.

In some embodiments, node management 224 may then send a request to instruct 438 new hot tier node 410 to perform queries to obtain the data prior to the creation point of the portion of the time series database. For example, the request may include token or other iterator which indicates a starting record and ending record to query for creating a copy at the new hot tier node 410. In some embodiments, the request 438 may identify a range of data to obtain (e.g., by time value), sources of the data (e.g., from one or multiple existing hot tier node(s) 430), and/or include a token for tracking performance of the replication process). New hot tier node 410 may send the quer(ies) 440 to existing node(s) 430 which may perform the quer(ies) and return result(s) 442 to existing hot tier node. In some embodiments, existing hot tier node may then reformat the query results into an ingestion format for storing the results as part of the copy being created at new hot tier node 410. Existing hot tier node 410 may then report progress 444 of the copy to node management 224. As noted above, in some embodiments progress may be indicated by a token, which node management may use to track progress of the replication to create the new copy of the portion of the time series database without requiring the new hot tier node 410 to maintain state for a copy creation workflow. Instead, the indication of the last copied records included in the token may indicate to node management what records remain to be copied.

As denoted by the outline 450, requests 438 through 444 may be repeated until the copy is complete (e.g., when all time series data prior to the creation point is copied (which may be limited to a starting point or boundary for the portion stored in the hot tier node, such as a partition boundary)). Node management 224 may then send a request to new hot tier node 410 to instruct it to perform received queries 448 (e.g., in addition to ingestion data from stream processing node 420). Although not illustrated, node management 224 may update a query processing node to begin directing queries to new hot tier node 410.

Figure 5:
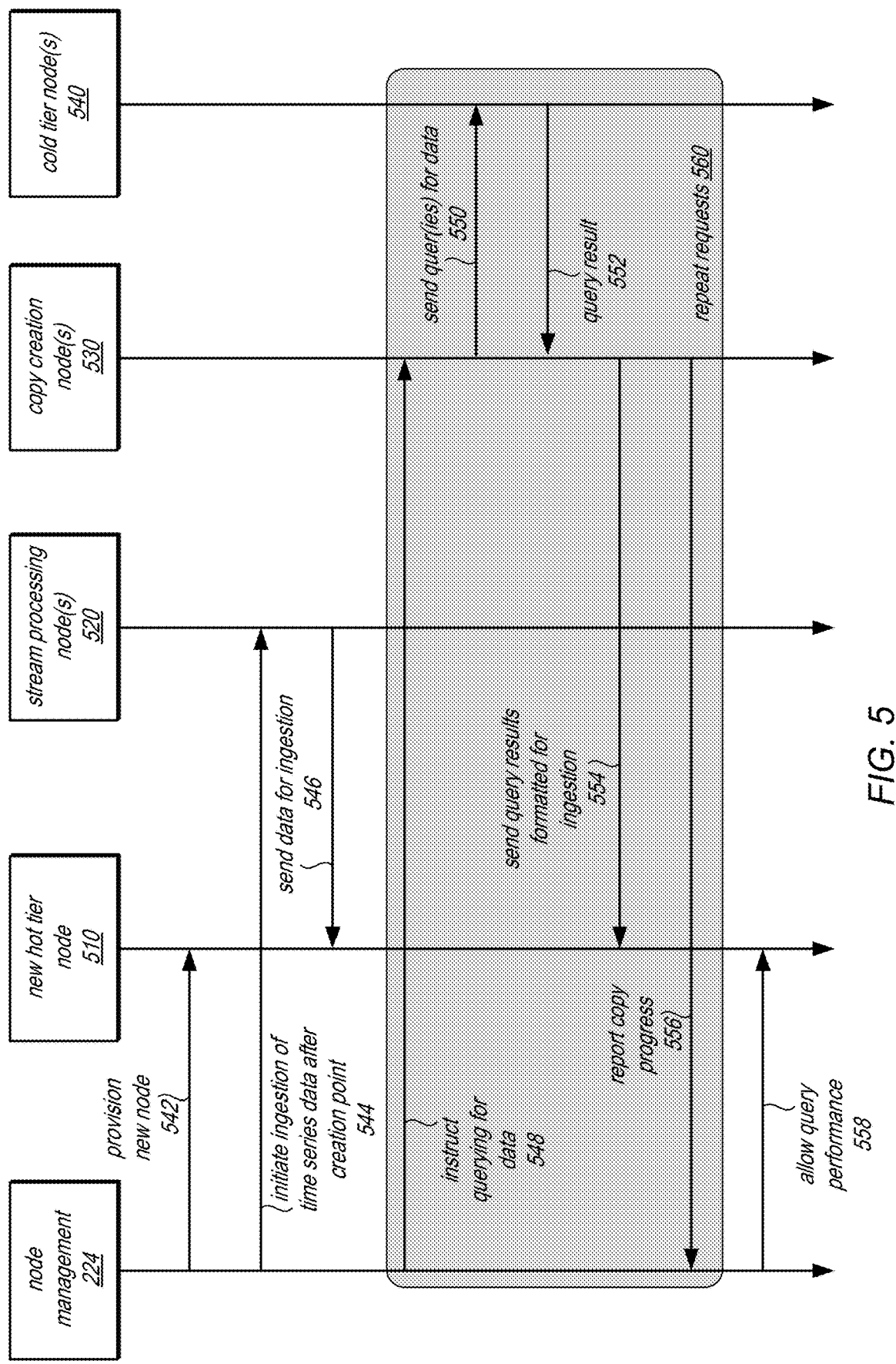
FIG. 5 is a sequence diagram illustrating cold tier replication for creating a copy of a portion of a time series database at a new host, according to some embodiments.

FIG. 5 is a sequence diagram illustrating cold tier replication for creating a copy of a portion of a time series database at a new host, according to some embodiments.

Similar to FIG. 4 discussed above, node management 224 may detect an event to add a new hot tier node 510. For example, node management 224 may perform one or more requests to provision 542 new hot tier node 510 (e.g., by obtaining a lease or permission to utilize a host system from a pool of available nodes/hosts, directing the installation or configuration of hot tier node software or other information, reserving or allocating space on an existing hot tier node storing another partition for another time series database (e.g., for another user account) as hot tier nodes and cold tier nodes may be multi-tenant, in some embodiments).

Node management 224 may then initiate 544 ingestion of time series data after a creation point for the portion of the time series database at stream processing nodes 520, in some embodiments. For example, node management 224 may send an updated mapping to stream processing node(s) 520, identifying new hot tier node 510 as ready to receive ingested data in a data stream from a data stream storage node, as discussed above. Stream processing node(s) 520 may begin sending data for ingestion 546 to new hot tier node 510, which may include the data in the new copy of the portion for the time series database in idempotent fashion.

In some embodiments, node management 224 may implement one or multiple (e.g., a fleet) of dedicated resources to create the copy of the portion of the time series database, such as copy creation node(s) 530 (which may be implemented on a computing system similar to computing system 1000 in FIG. 9 below). Node management 224 may then send a request to instruct 548 one or more copy creation node(s) 530 to perform queries to obtain the data prior to the creation point of the portion of the time series database. In some embodiments, the request 548 may identify a range of data to obtain (e.g., by time value), sources of the data (e.g., from one or multiple existing cold tier node(s) 540), and/or include a token for tracking performance of the replication process). Utilizing cold tier node(s) 540, instead of hot tier nodes, may incur a less a visible (to a user) cost to perform the queries than existing hot tier nodes, as discussed above with regard to FIG. 4, because the queries performed at cold tier node(s) 540 are not expected to be as performant as queries to hot tier nodes, in some embodiments.

Copy creation node(s) 530 may send the quer(ies) 550 to cold tier node(s) 540 which may perform the quer(ies) and return result(s) 552 to copy creation node(s) 530. In some embodiments, copy creation node(s) 530 may then reformat the query results into an ingestion format for storing the results as part of the copy being created at new hot tier node 510. Reformat operations may be computationally expensive, in some embodiments. Moving the reformatting operations to copy creation nodes instead of new hot tier node 510 may significantly reduce the burden of creating the copy at new hot tier node 510 (and also may allow for the work of reformatting data to be distributed amongst multiple copy creation nodes 530 instead of the single new hot tier node 510). Copy creation node(s) 530 may then send the query results reformatted for ingestion 554 to new hot tier node 510 (which may ingest the results 554 similar to date 546 received from stream processing node(s), which may reduce the burden on new hot tier node 510 to perform reformatting. Creation copy node(s) 530 may then report progress 556 of the copy to node management 224. In some embodiments, progress may be indicated by a token, which node management may use to track progress of the replication to create the new copy of the portion of the time series database (e.g., by including a sequence number, timestamp, or other indication of position within the time series data to indicate up to what point in time have records been copied o new hot tier node 510). As denoted by the outline 560, requests 548 through 556 may be repeated until the copy is complete (e.g., when all time series data prior to the creation point is copied (which may be limited to a starting point or boundary for the portion stored in the hot tier node, such as a partition boundary)). Node management 224 may then send a request to new hot tier node 510 to instruct it to perform received queries 558 (e.g., in addition to ingestion data from stream processing node 420). Although not illustrated, node management 224 may update a query processing node to begin directing queries to new hot tier node 510.

Note that the techniques discussed above could be performed in various combinations not illustrated (e.g., replicate from cold tier nodes to create a new cold tier node, replicate from hot tier nodes to create a cold tier node, using copy creation nodes to replicate from hot tier nodes, and so on), in different embodiments.

Figure 6:
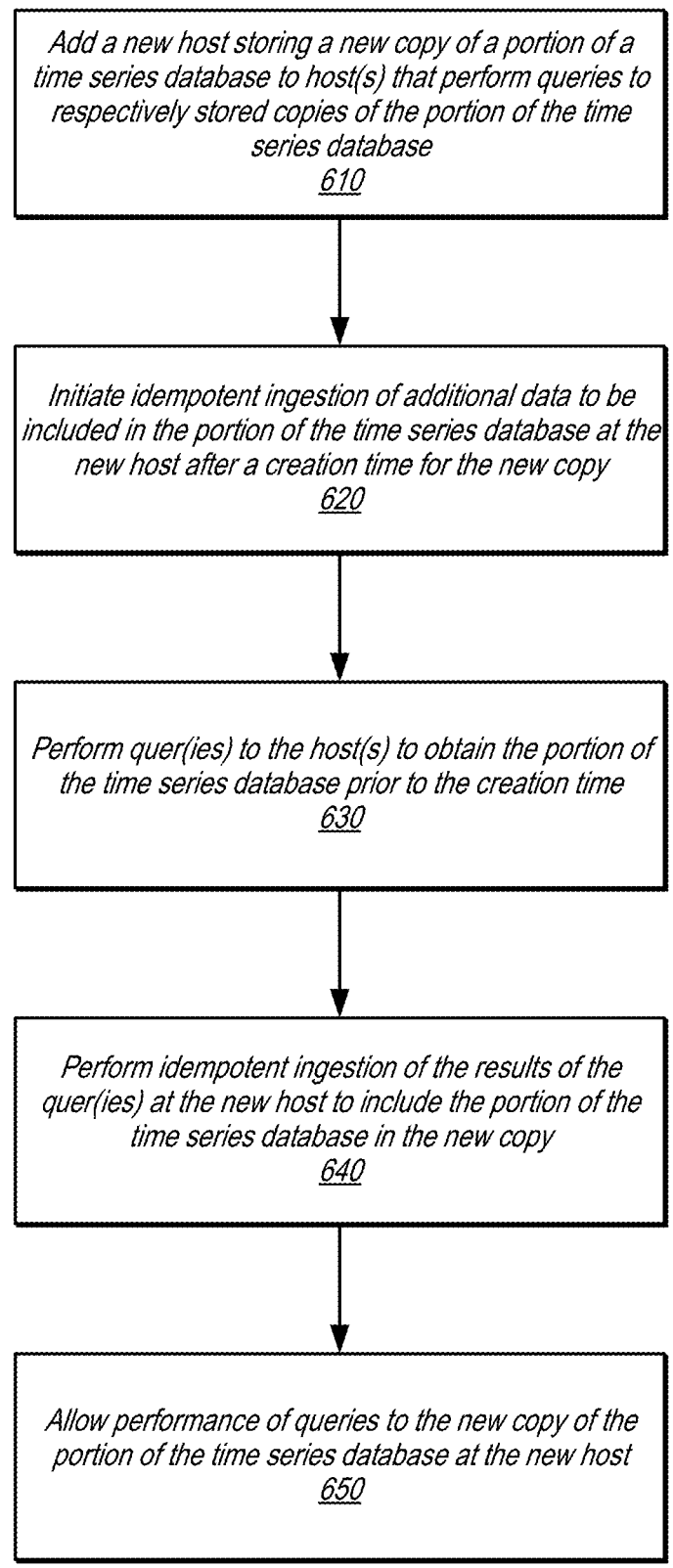
FIG. 6 is a high-level flowchart illustrating various methods and techniques to implement creating replicas using queries to a time series database, according to some embodiments.

The examples of a time series database that implements creating replicas using queries to a time series database as discussed in FIGS. 2-5 above have been given in regard to a time series database service. However, various other types of database systems that organize, store, or otherwise provide access to data that is stored according to time values (e.g., indexed based on timestamps) may implement creating replicas using queries to a time series database, in other embodiments. FIG. 6 is a high-level flowchart illustrating various methods and techniques to implement creating replicas using queries to a time series database, according to some embodiments. These techniques, as well as the techniques discussed with regard to FIGS. 7-8, may be implemented using components or systems as described above with regard to FIGS. 2-5, as well as other types of databases, storage engines, or distributed storage systems, and thus the following discussion is not intended to be limiting as to the other types of systems that may implement the described techniques.

As indicated at 610, a new host storing a new copy of a portion of a time series database may be added to host(s) that perform queries to respectively stored copies of the portion of the time series database, in various embodiments. For example, a new host may be provisioned from a pool of existing hosts that store time series database portions for other time series databases according to the storage or processing capacity of the existing hosts to accept the new copy. In some embodiments, a new host may be launched, initiated, started, booted, or otherwise acquired to store the new copy. A mapping of hosts that store copies of the portion of the time series database (e.g., a partition of the time series database) may be updated to identify the new host, in some embodiments. The new host could be a new host in many different storage tiers (e.g., hot or cold in the examples given above with regard to FIG. 3). Similarly, the host(s) that store the respective copies could be hosts from the same or different storage tier as the new host (and/or among each other, such as a combination of both hot and cold tier hosts).

As indicated at 620, idempotent ingestion of additional data to be included in the portion of the time series database at the new host after a creation time for the new copy may be initiated, in some embodiments. For example, an ingestion pipeline or other time series database frontend may be updated to direct received time series data for the portion of the database to the new host in addition to the existing host(s). Idempotent ingestion may be enforced at the new host by ensuring that only a single record, item, object, or data point is stored in the portion, regardless of the number of requests to store the single record, item, object or data point received at the new host.

As indicated at 630, one or more queries to the host(s) may be performed to obtain the portion of the time series database prior to the creation time. For instance, the queries may be queries for different ranges of the data (which may be non-overlapping ranges in some embodiments) so that different host(s) may return different parts of the data prior to the creation time for the portion of the time series database (e.g., host A may be queried for and return records 1-10, host B may be queried for and return records 11-20, host C may be queried for and return records 21-30, and so on), in some embodiments. The queries for the data may be formatted and sent according to a same query interface for which clients of the time series database send queries for time series data to the hosts, in some embodiments.

As indicated at 640, idempotent ingestion of the result(s) of the quer(ies) at the new host to include the portion of the time series database in the new copy may be performed, in some embodiments. Similar to the discussion above, idempotent ingestion of the results may include ensuring that only a single record, item, object, or data point is stored in the portion, regardless of the number of requests to store the single record, item, object or data point received at the new host (which could occur if, for example, one or more queries are retried due to timeout and then the retried and the original query results are returned). In some embodiments, query results may be reformatted prior to ingestion (e.g., into a different data structure, encoding, arrangement, or other representation used at the new host, such as an in-memory format for a hot tier node or a persistent storage format for a cold tier node).

As indicated at 650, after completing ingestion of the results of the queries at the new host, performance of queries to the new copy of the portion of the time series database may be allowed at the new host. For example, a configuration setting at the new host may be updated to allow read requests (e.g., queries). A request router, load balancer, or other feature that selects hosts for servicing queries to the portion of the time series database may be updated to include the new host for querying.

Figure 7:
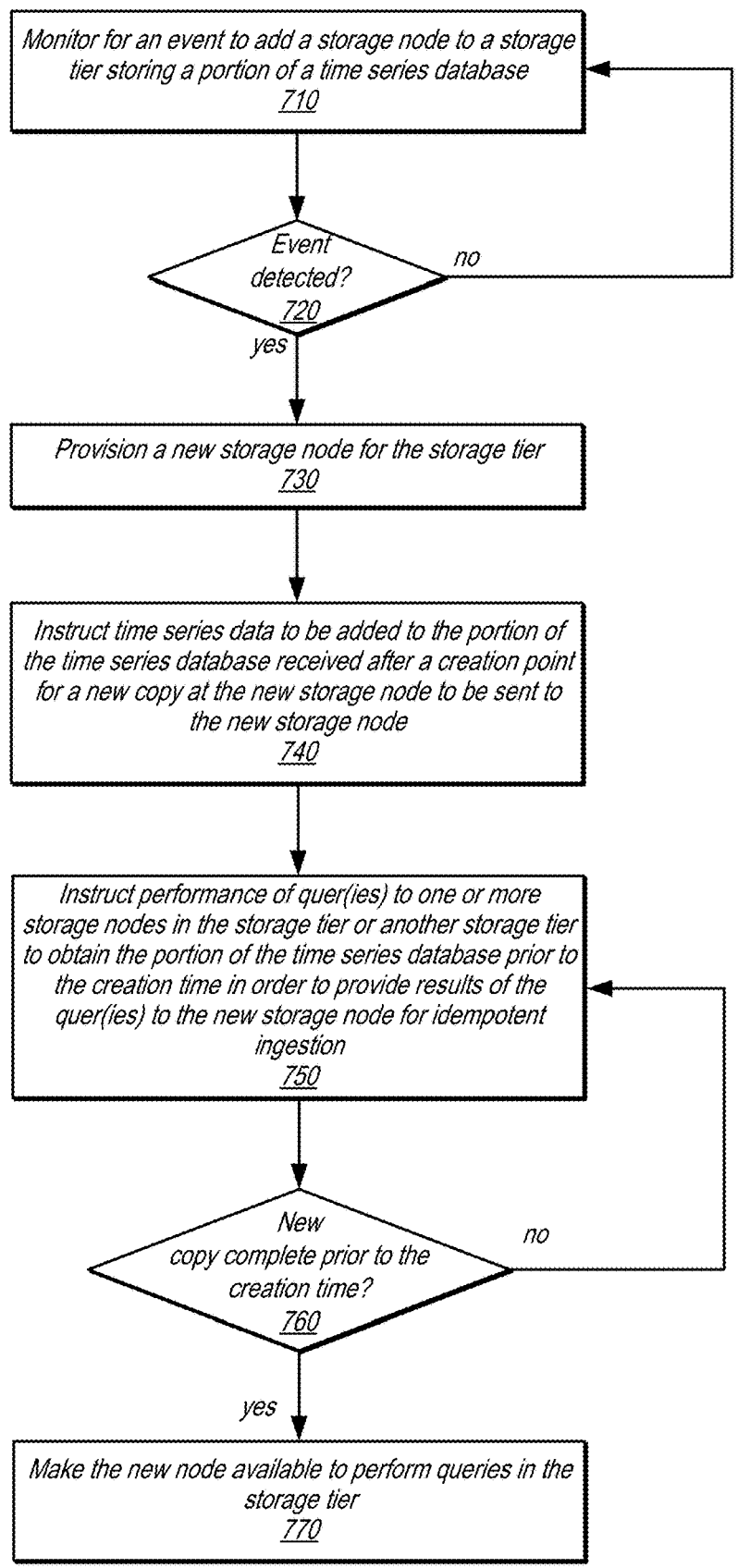
FIG. 7 is a high-level flowchart illustrating various methods and techniques to direct creation of replicas using queries to a time series database, according to some embodiments.

FIG. 7 is a high-level flowchart illustrating various methods and techniques to direct creation of replicas using queries to a time series database, according to some embodiments. As indicated at 710, a control plane, or other management feature of a time series database, may monitor for an event to add a storage node to a storage tier for storing a portion of a time series database, in some embodiments. For example, a control plane may monitor storage nodes for failure, over utilization, or other event to add a storage node to a storage tier, such as an event that triggers a move of a portion of a time series database. If an event is detected, as indicated by the positive exit from 720, then a new storage node may be provisioned for the storage tier, as indicated at 730, in some embodiments. For example, a control plane may obtain a lease or permission to utilize a storage node system from a pool of available nodes, directing the installation or configuration of storage tier node software or other information, reserving or allocating space on an existing storage tier node storing another portion for another time series database (e.g., for another user account) as storage tier nodes may be multi-tenant, in some embodiments).

As indicated at 740, time series data to be added to the portion of the time series database received after a creation point for a new copy at the new storage node to be sent to the new storage node. As discussed above, an ingestion pipeline or other time series database frontend may be updated to direct received time series data for the portion of the database to the new host in addition to the existing host(s). Idempotent ingestion may be enforced at the new host by ensuring that only a single record, item, object, or data point is stored in the portion, regardless of the number of requests to store the single record, item, object or data point received at the new host.

As indicated at 750, performance of quer(ies) to one or more storage nodes in the storage tier or another storage tier to obtain the portion of the time series database prior to the creation time in order to provide results of the quer(ies) to the new storage node for idempotent ingestion, in some embodiments. Instructions may be performed for the same (or different quer(ies) if not all data is requested at once) until the new copy is complete prior to the creation time, as indicated by the positive exit from 760. Then, as indicated at 770, the new node may be made available to perform queries in the storage tier, in some embodiments.

Figure 8:
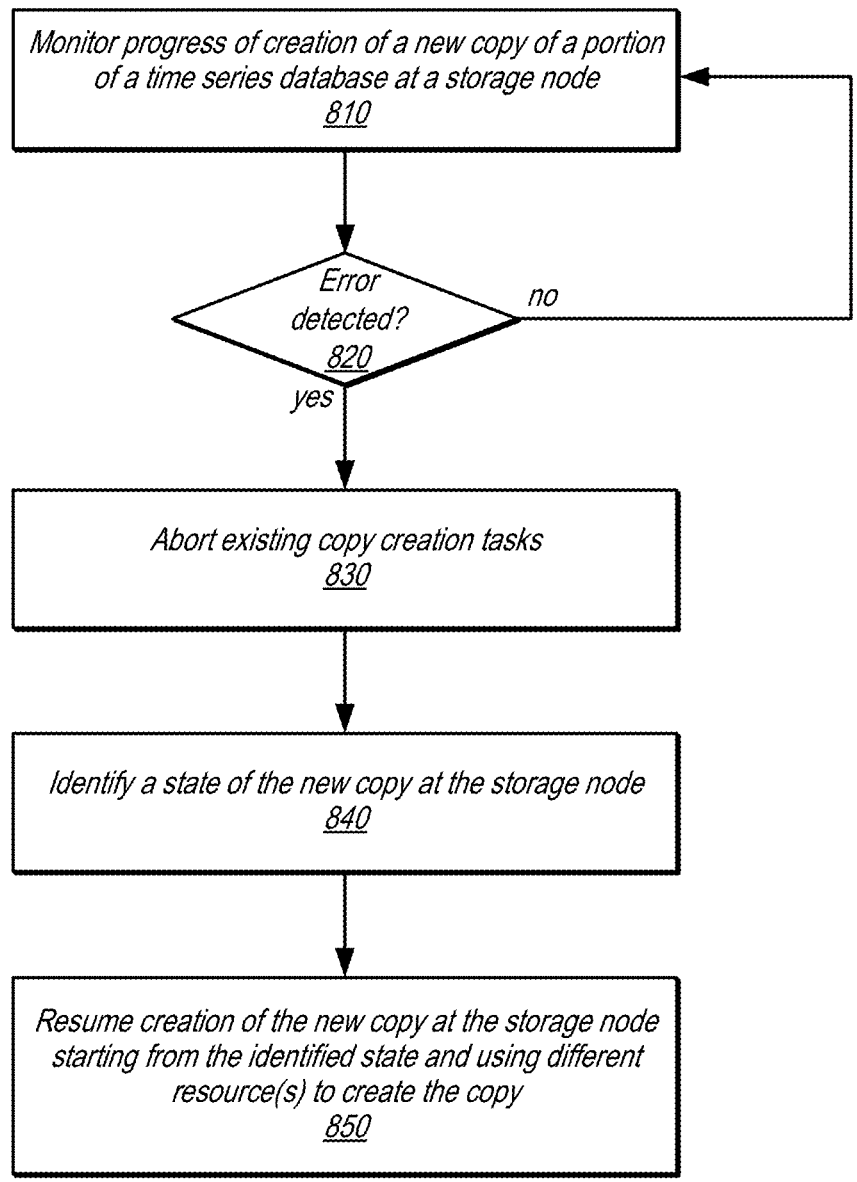
FIG. 8 is a high-level flowchart illustrating various methods and techniques to handle replication creation errors, according to some embodiments.

FIG. 8 is a high-level flowchart illustrating various methods and techniques to handle replication creation errors, according to some embodiments. As indicated at 810, progress of creation of a new copy of a portion of a time series database at a storage node may be monitored, in some embodiments. For example, time between status reports may be compared with a threshold or progress indicated by a pagination token (e.g., indicating a stuck or timed out query) may be evaluated for errors. If an error is detected, then as indicated by the positive exit from 820, existing copy creation tasks may be aborted, as indicated at 830. For example, query requests may be cancelled or results ignored at the storage node.

As indicated at 840, a state of the new copy at the storage node may be identified in some embodiments. For example, the pagination token may indicate which range (or ranges) of time period data were successfully queried and included in the new copy. From this, uncopied or time series data that remains to be obtained can be identified. Utilizing a pagination token in this way may prevent any of the nodes performing the copying (e.g., a copy creation node or new node) from having to maintain state for the copy creation while still allowing recovery or resumption from failures or stalled creation of copies. As indicated at 850, creation of the new copy at the storage node may then resume starting from the identified state and using difference resource(s) to create the copy, in some embodiments. For example, queries for remaining data may be instructed (not already included data). In some embodiments, different copy creation nodes, or a change to the storage node storing the new copy may be the different resources used. Or, a different source for the remaining data, such as a switch to cold tier storage nodes from hot tier storage nodes, may be the different resources used, in some embodiments.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Embodiments to implement creating replicas using queries to a time series database as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

Figure 9:
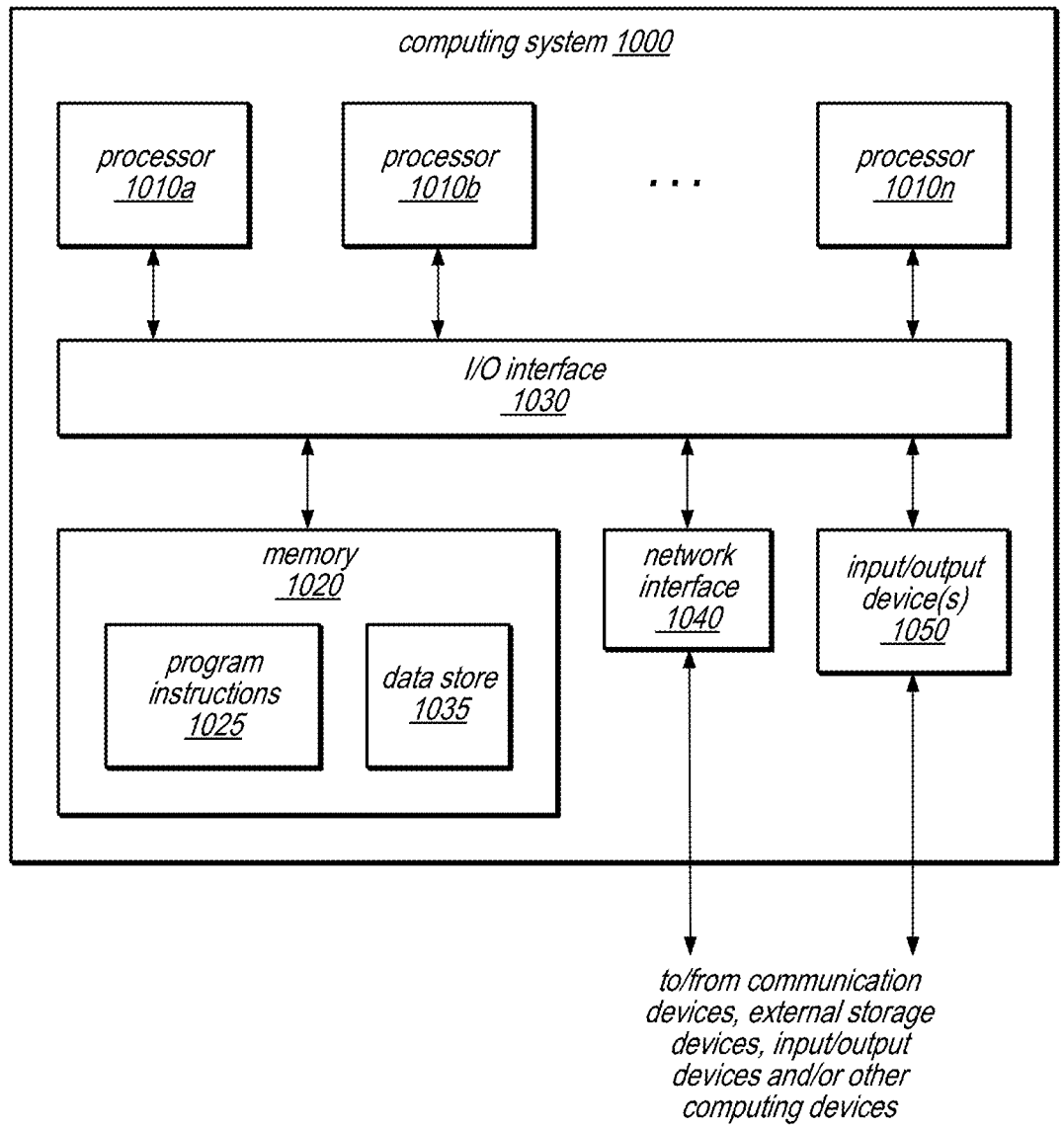
FIG. 9 is a block diagram illustrating an example computing system, according to some embodiments.

As shown in FIG. 9, memory 1020 may include program instructions 1025, that implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor cause the at least one processor to implement a control plane for a time series database;
   the control plane, configured to:
      detect an event to add a new hot tier node that stores a new copy of a portion of the time series database, wherein the new hot tier node is added to one or more hosts that perform queries to respectively stored copies of the portion of the time series database;
      provision the new hot tier node to store the new copy of the portion of the time series database;
      initiate idempotent ingestion of additionally received data to be included in the portion of the time series database at the new hot tier node after a creation time for the new copy;
      instruct performance, by the new hot tier node, of one or more queries to at least one of the one or more hosts to obtain the portion of the time series database prior to the creation time, wherein the one or more hosts comprise one or more cold tier nodes;
      instruct idempotent ingestion of results of the one or more queries at the new hot tier node to include the portion of the time series database in the new copy, wherein the idem potent ingestion comprises modifying the results from a cold tier format to a hot tier format for ingestion at the new hot tier node; and
      responsive to detecting completion of the idem potent ingestion of the results of the one or more queries, make the new hot tier node selectable by a request router to perform queries to the time series database using the new copy of the portion of the time series at the new hot tier node in addition to the one or more or more hosts.

2. The system of claim 1, wherein the control plane is configured to:
   perform the queries to the respectively stored copies of the portion of the time series database using foreground operations that enable load balancing or query optimization of the queries.

3. The system of claim 1, wherein to instruct performance of one or more queries to at least one of the hosts to obtain the portion of the time series database prior to the creation time, the control plane is configured to instruct different ones of the queries to query for different ranges of the portion of the time series database prior to the creation time to be performed at different ones of the one or more hosts.

4. The system of claim 1, wherein the control plane and the time series database are implemented as part of a database service offered by a provider network.

5. A method, comprising:
   adding a new hot tier node that stores a new copy of a portion of a time series database, wherein the new hot tier node is added to one or more hosts that perform queries to respectively stored copies of the portion of the time series database;

initiating idem potent ingestion of additional data to be included in the portion of the time series database at the new hot tier node after a creation time for the new copy;

performing, by the new hot tier node, one or more queries to at least one of the one or more hosts to obtain the portion of the time series database prior to the creation time, wherein the one or more hosts comprise one or more cold tier nodes;

performing idempotent ingestion of results of the one or more queries at the new hot tier node to include the portion of the time series database in the new copy, wherein the results are modified from a cold tier format to a hot tier format for ingestion at the new hot tier node; and responsive to completing performance of idem potent ingestion of the results of the one or more queries, making the new hot tier node selectable by a request router to allow performance of queries to the time series database using the new copy of the portion of the time series at the new hot tier node in addition to the one or more hosts.

6. The method of claim 5, wherein the one or more queries are performed using foreground operations that enable load balancing or query optimization of the one or more queries.

7. The method of claim 5, wherein the new copy of the portion of the time series database is a portion split from a partition of the time series database.

8. The method of claim 5, wherein performing the one or more queries to the at least one of the hosts to obtain the portion of the time series database prior to the creation time performs different ones of the queries to query for different ranges of the portion of the time series database prior to the creation time at different ones of the one or more hosts.

9. The method of claim 5, wherein a copy creation node performs the one or more queries to the at least one host, and wherein the method further comprises:
   modifying, by the copy creation node, the results received from the one or more queries into the hot tier format for ingestion at the new hot tier node; and
   sending the modified results to the new hot tier node for idem potent ingestion.

10. The method of claim 5, further comprising:
    prior to allowing performance of queries to the new copy of the portion of the time series at the new hot tier node:
       detecting an error in the creation of the new copy of the portion of the time series database;
       identifying a state of the new copy at the new hot tier node according to a pagination token; and
       resuming creation of the new copy at the new hot tier node starting from the identified state and using at least one different resource to create the new copy.

11. The method of claim 5, further comprising:
    detecting an event to increase query processing capacity for the portion of the time series database; and
    wherein adding the new hot tier node is performed responsive to detecting the event to increase query processing capacity for the portion of the time series database.

12. The method of claim 5, wherein the new hot tier node is included in a hot storage tier, and wherein the one or more hosts that perform the queries to the respectively stored copies of the portion of the time series database are included in a cold storage tier.

13. One or more non-transitory, computer-readable storage media, storing program instructions that when executed on or across one or more computing devices cause the one or more computing devices to implement:
    provisioning a new hot tier node that stores a new copy of a portion of a time series database, wherein the provisioned new hot tier node is added to one or more hosts that perform queries to respectively stored copies of the portion of a time series database;
    initiating idem potent ingestion of additional data to be included in the portion of the time series database at the new hot tier node after a creation time for the new copy;
    causing performance, by the new hot tier node, of one or more queries to at least one of the one or more hosts to obtain the portion of the time series database prior to the creation time in order to provide results of the one or more queries to the new hot tier node for idempotent ingestion of the results at the new hot tier node to include the portion of the time series database in the new copy, wherein the one or more hosts comprise one or more cold tier nodes, and wherein the results are modified from a cold tier format to a hot tier format for ingestion at the new hot tier node; and
    responsive to detecting completion of the idem potent ingestion of the results of the one or more queries, making the new hot tier node selectable by a request router to perform queries to the time series database using the new copy of the portion of the time series at the new hot tier node in addition to the one or more or more hosts.

14. The one or more non-transitory, computer-readable storage media of claim 13, wherein the program instructions when executed by the one or more computing devices cause the one or more computing devices to further implement:
    detecting an event to increase query processing capacity for the portion of the time series database; and
    wherein adding the new hot tier node is performed responsive to detecting the event to increase query processing capacity for the portion of the time series database.

15. The one or more non-transitory, computer-readable storage media of claim 13, wherein causing performance of one or more queries to at least one of the one or more hosts to obtain the portion of the time series database prior to the creation time causes different ones of the queries to query for non-overlapping ranges of the portion of the time series database prior to the creation time at different ones of the one or more hosts.

16. The one or more non-transitory, computer-readable storage media of claim 13, wherein in causing performance of one or more queries to at least one of the hosts to obtain the portion of the time series database prior to the creation time, the program instructions when executed by the one or more computing devices cause the one or more computing devices to implement including a token in a request to the new hot tier node to perform the one or more queries and receiving back the token from the new hot tier node to indicate a progress of the creation of the new copy at the new hot tier node.

17. The one or more non-transitory, computer-readable storage media of claim 13, wherein a copy creation node performs the one or more queries to the at least one host, and wherein the program instructions when executed by the one or more computing devices cause the one or more computing devices to further implement:

modifying, by the copy creation node, the results received from the one or more queries into the hot tier format for ingestion at the new hot tier node; and sending the modified results to the new hot tier node for idem potent ingestion.

18. The one or more non-transitory, computer-readable storage media of claim 17, wherein the one or more queries are performed using foreground operations that enable load balancing or query optimization of the one or more queries.

* * * * *